US009286938B1

(12) United States Patent
Tseytlin

(10) Patent No.: US 9,286,938 B1
(45) Date of Patent: Mar. 15, 2016

(54) GENERATING AND PROVIDING DIFFERENT LENGTH VERSIONS OF A VIDEO

(71) Applicant: Google Inc., Mountain View, CA (US)

(72) Inventor: Yan Tseytlin, Wayne, NJ (US)

(73) Assignee: Google Inc., Mountain View, CA (US)

( * ) Notice: Subject to any disclaimer, the term of this patent is extended or adjusted under 35 U.S.C. 154(b) by 66 days.

(21) Appl. No.: 14/146,411

(22) Filed: Jan. 2, 2014

(51) Int. Cl.
*H04N 5/77* (2006.01)
*G11B 27/02* (2006.01)

(52) U.S. Cl.
CPC ...................................... *G11B 27/02* (2013.01)

(58) Field of Classification Search
CPC .................................................. H04N 21/8549
USPC ........................................................ 386/241
See application file for complete search history.

(56) References Cited

U.S. PATENT DOCUMENTS

| 7,480,442 | B2 | 1/2009 | Girgensohn et al. | |
|---|---|---|---|---|
| 7,738,778 | B2 | 6/2010 | Agnihotri et al. | |
| 8,503,523 | B2 | 8/2013 | Williams et al. | |
| 8,561,115 | B2 | 10/2013 | Hattori et al. | |
| 2009/0132924 | A1* | 5/2009 | Vasa et al. | 715/723 |
| 2009/0313546 | A1* | 12/2009 | Katpelly et al. | 715/723 |

* cited by examiner

*Primary Examiner* — Hung Dang
*Assistant Examiner* — Girumsew Wendmagegn
(74) *Attorney, Agent, or Firm* — Byrne Poh LLP

(57) ABSTRACT

Systems and methods for generating and presenting different length versions of a video are presented. In one or more aspects, a system is provided that includes an analysis component configured to analyze a video and generate summaries of content included in respective segments of the video, and a summary component configured to generate shortened versions of the video having durations less than the duration of the video based in part on the summaries of the content included in the respective segments of the video, wherein the video is made available for streaming in association with an option to select the video or one of the shortened versions.

20 Claims, 12 Drawing Sheets

GENERATING AND PROVIDING DIFFERENT LENGTH VERSIONS OF A VIDEO

TECHNICAL FIELD

This application generally relates to systems and methods for generating and providing different length versions of a video.

BACKGROUND

Watching television (TV) is a leisure activity many people around the world routinely engage in. The notion of turning on the TV and having regularly scheduled content ready to digest is both relaxing and predictable. However, broadcast media content is generally provided to viewers at a fixed length which is predefined by the content itself, the broadcast networks and supplementary advertising media. Due to a general level of inflexibility associated with traditional broadcast television with respect to selecting which shows to watch, when to watch them and how long to watch them, current and future generations of viewers are turning to online video streaming services.

These online video streaming services allow users to select from a variety of media content for viewing on demand. Further with the ubiquitous nature of media creation and publishing tools, individuals are able to become productive content creators. This has resulted in exponential growth of available streaming media content. In order to increase viewership and continue to draw viewers away from conventional broadcast media, these online video streaming services are constantly seeking mechanisms to provide viewers with media consumption options that are tailored to user's individual needs and that capitalize on flexibility and media viewing control options that originally incentivized viewers to turn to online video streaming services.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
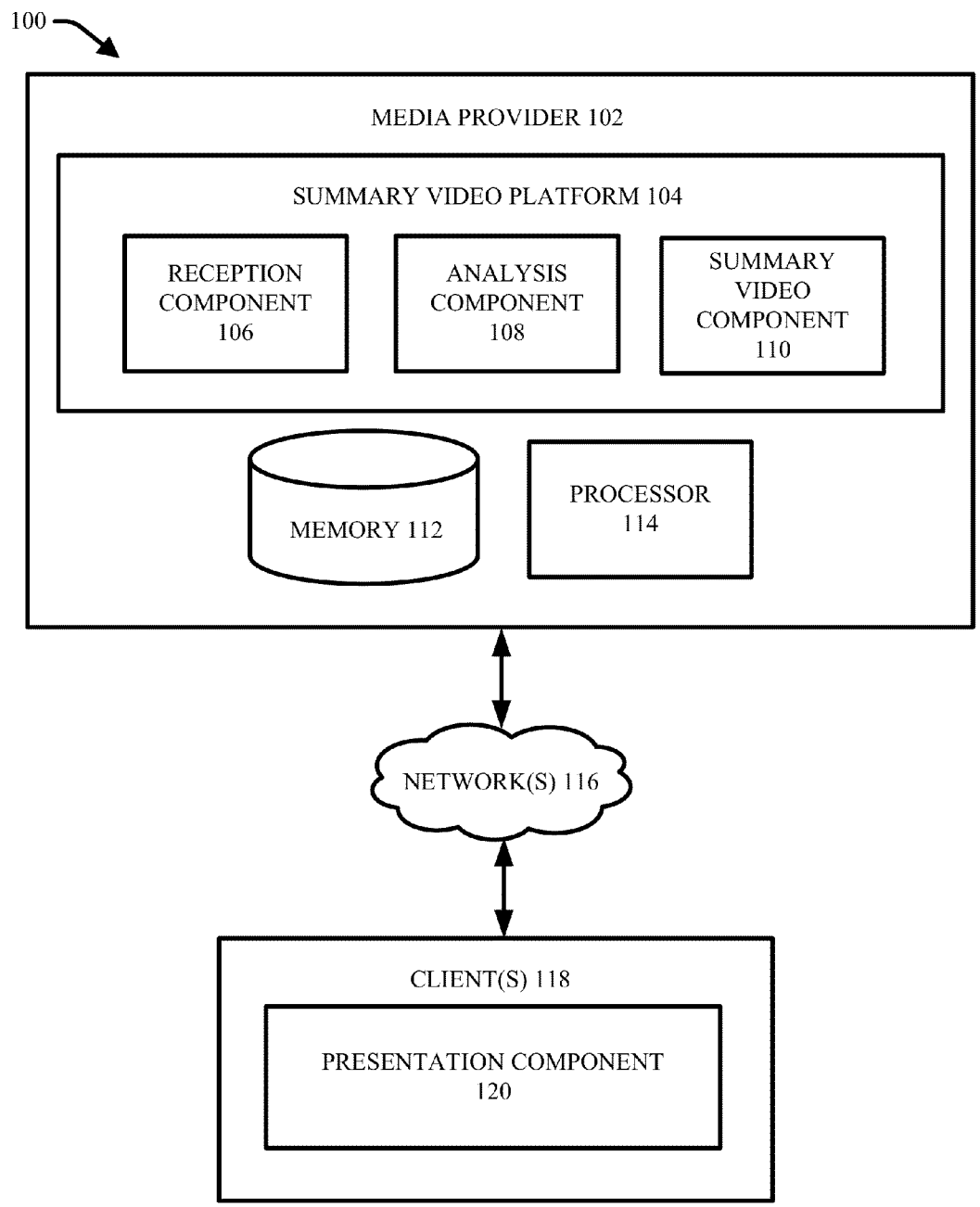
FIG. 1 illustrates an example system for generating and providing different length versions of a video in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for generating and providing different length versions of a video. Often times, users have various windows of time to view videos that are available on demand, such as videos provided by an online media provider. As a result, a user may pass over watching a video that is longer than a current window of viewing time available to the user. The subject matter described in this disclosure therefore provides systems and methods for generating different length versions of a video and making these different length versions of the video available for streaming to users so that the users can select a version of the video for viewing that is suitable to them based on a current amount of time they would like to devote to watching the video.

In an embodiment, a video streaming system configured to provide on demand streaming video to users via a network can automatically generate different length versions of a video provided by the video streaming system. For example, for a video that is 37 minutes in length, the video streaming system can generate a version of the video that is 5 minutes in length, 10 minutes in length and 20 minutes in length. The video streaming system can further make these different length versions of the video available to viewers in addition to the original video. For example, a video can be presented to users with the option to select one of the different length versions of the video for viewing (e.g., the original 37 minute version, the 5 minute version, the 10 minute version, or the 20 minute version).

In an aspect, after a video is uploaded to or otherwise provided to the video streaming system, the video streaming system can systematically summarize the video source file and generate a 'cliffs notes' version of the source file with summaries of the content included in respective segments of the video. Using the summarized video content, the system can automatically edit the video to include or exclude different segments of the video and generate different length versions of the video. On the client side, when coming across the video while navigating the video streaming system via a user interface configured by the video streaming system (e.g., a website platform or application platform), the user can be provided with the option to choose which length version of the video to watch.

In an aspect, the uploader of the video can facilitate choosing which segments of the video to include/exclude in different length versions of the video. The uploader can also provide input regarding the number of different length versions to create and desired durations of the different length versions of the video (e.g., for a 30 the uploader can request that the video streaming system generate a 5 minute version, a 10 minute version, and a 15 minute version). In another aspect, the video streaming system can create an edited version of the video fitting an amount of time provided by the viewer in association with a request to watch the video. For example, a user can find a 30 minute video and request to watch a 7.5 minute version of the video. In response to the request, the video streaming system can create the 7.5 minute version of the video on the fly and provide it to the user for viewing.

In one or more aspects, a system is provided that includes an analysis component configured to analyze a video and generate summaries of content included in respective segments of the video. The system further includes a summary component configured to generate shortened versions of the video having durations less than the duration of the video based in part on the summaries of the content included in the respective segments of the video, wherein the video is made available for streaming in association with an option to select the video or one of the shortened versions.

In another aspect, a method is disclosed that includes using a processor to execute computer executable instructions stored in a memory to perform acts including generating summaries of content included in respective segments of a video, and receiving a request to play a shortened version of the video, the request including a desired length of the shortened version of the video. The acts further include generating the shortened version of the video having the desired length in response to the request based in part on the summaries of the content included in the respective segments of the video, and streaming the shortened version of the video to a device associated with the request.

Further provided is a tangible computer-readable storage medium comprising computer-readable instructions that, in response to execution, cause a computing system to perform various operations. The operations include at least, generating summaries of content included in respective segments of the video, and generating shortened versions of the video having durations less than the duration of the video based in part on the summaries of the content included in the respective segments of the video, wherein the video is made available for streaming in association with an option to select the video or one of the shortened versions.

Referring now to the drawings, with reference initially to FIG. 1, presented is a diagram of an example system 100 for generating and presenting different length versions of a video, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes media provider 102, one or more client devices 118 and one or more networks 116 for connecting the one or more client devices 118 with media provider 102. Media provider 102 can include an entity configured to provide streaming videos to clients 118 via a network 116. Media provider 102 can include summary video platform 104 to facilitate generating shortened versions or summary versions of videos provided by media provider 102. Media provider 102 can further include memory 112 for storing computer executable components and processor 114 to facilitate operation of the instructions (e.g., computer executable components and instructions) by media provider 102.

Media provider 102 can include an entity that provides media content (e.g., video, streaming video, live streaming video, images, thumbnails or other static representations of video) to client device(s) 118 via a network 116 (e.g., the Internet). Client device 118 can include presentation component 120 to generate a user interface (e.g., a graphical user interface or virtual interface) that displays media content provided by media provider 102 to a user of the client device. In an aspect, presentation component 120 can include an application (e.g., a web browser) for retrieving, presenting and traversing information resources on the World Wide Web. For example, media provider 102 can provide and/or present media content to a client device 118 via a website that can be accessed using a browser of the client device 118. In another example, media provider 102 can provide and/or present media content to a client device 118 via a cellular application platform. According to this application, presentation component 120 can employ a client application version of the media provider that 102 that can access the cellular application platform of media provider 102. In an aspect, the media content can be presented and/or played at client device 118 using a video player associated with media provider 102 and/or client device 118.

As used herein the term media content or media item can include but is not limited to streamable media (e.g., video, live video, video advertisements, music, music videos, sound files and etc.) and static media (e.g., pictures, thumbnails). In some aspects, the term media content or media item includes a collection of media items such as a playlist including several videos or songs, or a channel including several videos or songs associated with a single media creator.

In an aspect, media provider 102 can employ one or more networked computing devices to store media content and deliver media content to users via a network 116. The media content can be stored in memory 112 associated with media provider 102 and/or at various networked devices employed by media provider 102 and accessed via client device 118 using a web based platform of the media provider 102. For example, media provider 102 can include a media presentation source that has access to a voluminous quantity (and potentially an inexhaustible number) of shared media (e.g., video and/or audio) files. The media presentation source can further stream these media files to one or more users at respective client devices 118 of the one or more users over a network 116. In another example, media provider 102 can include any entity that provides videos to users along with other content and services (e.g., a social networking website that provides social networking services and social videos or an educational website that provides educational videos and services).

Client device 118 can include any suitable computing device associated with a user and configured to interact with media provider 102, and/or summary video platform 104. For example, client device 1180\ can include a desktop computer, a laptop computer, a television, an Internet enabled television, a mobile phone, a smartphone, a tablet personal computer (PC), or a personal digital assistant PDA. As used in this disclosure, the terms "content consumer" or "user" refer to a person, entity, system, or combination thereof that employs system 100 (or additional systems described in this disclosure) using a client device 118. Network(s) 116 can include wired and wireless networks, including but not limited to, a cellular network, a wide area network (WAD, e.g., the Internet), a local area network (LAN), or a personal area network (PAN). For example, client device 118 can communicate with media provider 102 (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

To facilitate generating different length versions of videos provided by media provider 102, summary video platform 104 can include reception component 106, analysis component 108 and summary video component 110. Reception component 106 is configured to receive videos uploaded to media provider 102 or otherwise provided to media provider 102 for which one or more shortened or summary versions of the video are to be created. In an aspect, reception component 106 can be configured to receive all videos uploaded to or otherwise provided by media provider 102 for which one or more shortened versions have not yet been generated and made available by media provider 102. In another aspect, reception component 106 can receive a video for processing by summary video platform 104 in response to a received request to generate one or more summarized versions of the video (e.g., from an uploader of the video or from a potential viewer of the video). For example, a user of media provider can upload a video to media provider for publishing and sharing with others. After the video is uploaded, the uploader can request and/or authorize that multiple different length versions of the video be created by media provider 102 and made available to others in addition to the original video. In response to such a request, the video can be received by reception component 106 for processing by summary video platform 104 to create the multiple different version of the video.

Analysis component 108 is configured to analyze a video received by reception component 106 to identify features associated with the content of the respective segments of the video. The term segment of a video includes a portion of a video less than the whole. In an aspect, a segment can include a frame of video. In another aspect, a segment can include a group of frames. Still in another aspect, a segment can be defined based on a duration of time segment of the video (e.g., a video can be divided into respective 5 second segments, 10 second segments, 15 second segments, etc.). Based on features associated with the respective segments included in a video, summary video component 110 can generate one or more shortened versions of the video by editing the video to remove or cut one or more of the segments of the video.

In an aspect, analysis component 108 can analyze respective segments of a video file and associate information (e.g., metadata tags) with the respective segments identifying features associated with the respective segments. For example, the metadata tags can identify objects, actors, places, locations and things appearing in the respective segments of a video. The metadata can also identify actions or activity occurring in the respective segments. For example, the tags can indicate an activity of driving, walking, running, sitting, fighting, dancing, etc. The metadata tags can also indicate points in time associated with content included in a segment of a video (e.g., night time, lunchtime, 1930s, during the Revolutionary War, in a futuristic time period, etc.). The metadata can also identify words spoken and music included in audio associated with the respective video segments.

Analysis component 108 can employ various video and audio analysis techniques to automatically identify the above noted features associated with respective videos segments and to automatically associate metadata with the respective segments describing the features. For example, analysis component 108 can employ facial recognition software and other types of object recognition software to identify people, objects and places present in respective segments of a video. Analysis component 108 can also employ software that tracks object movement, tempo, color change, color contrast, etc., to infer or determine activity and actions occurring in a video. In an aspect, analysis component 108 can employ text to speech software to identify words spoken at respective segments of a video. In another aspect, rather than employing text to speech software, analysis component 108 can analyze text of an existing transcript of the audio portion (e.g., a closed caption file) of a video.

Analysis component 108 can also associate information with respective segments of a video representative of collective user engagement or interest in the respective segments. In particular, as a user watches a video, the user can provide various clues that are indicative of whether the user finds a particular portion or part of the video interesting or not. For example, as a user watches a video the user may fast forward past parts of the video the user finds uninteresting to arrive at a portion of the video the user finds interesting. A user can also perform various other actions that can indicate an interest in a particular portion of a video. For example, a user may rewind back to interesting parts of a video, comment on interesting parts of a video, re-watch interesting parts of a video, or share links to interesting parts of a video. A user can also perform various actions that indicate a disinterest in certain parts of a video. For example, the user may stop watching a video upon the occurrence of a disinteresting part or provide comments indicating a disinterest in a particular part of a video.

Information related to user interest/engagement in respective segments of a video can further be employed by analysis component 108 (or another system) to determine levels of relative user interest/engagement in the respective segments of the video. Information representing user engagement/interest in a video segment can thus be associated with the respective segments and used to determine which segments of a the video to include/exclude in a summary video.

Analysis component 108 can also associate information with respective segments of a video indicating whether the segments are the start of a new scene or event in the video. For example, analysis component 108 can employ automatic scene detection mechanisms and analyze an encoded/compressed video consisting of a plurality of intra-frame (I-frames) interspersed with predictive frame inter-frames (P-frame) and/or a bi-predictive inter-frames (B-frame). The I-frames can be identified and tagged by analysis component 108 as boundary frames between different scenes of the video. For example, each I-frame occurring in a video comprising a plurality of sequential frames can be considered the start of a new scene in the video. Groups of adjacent frames occurring between respective I-frames can constitute a separate scene in the video. In an aspect, video compression is tailored to facilitate encoding frames of a video as I-frames or P-frames/B-frames based on parameters that recognize spatial and temporal differences between frames associated with scene changes.

In an aspect, based on the variety of information identified by analysis component 108 regarding features of respective segments of a video (e.g., including but not limited: things appearing in a segment, actions occurring in a segment, words spoken in a segment, music occurring in a segment, level of user interest in a segment, whether the segment is associated with a start of a new scene, etc.), analysis component 108 can further automatically generate summaries of respective segments or groups of segments of a video. For example, analysis component 108 can generate metadata to associate with a video file that summarizes (e.g., in text), primary aspects and features associated with respective segments or groups of segments of the video. For instance, the metadata can indicate what segments of a video are associated with different scenes of a video, what generally occurs in the respective scenes, who predominately appears in the respective scenes, why those persons appear in the respective scenes, highlights of the scenes (e.g., a punch line, a climactic moment, a funny moment, etc.), user interest in the respective scenes and/or specific features/highlights of the scenes, etc. In other words, analysis component 108 can generate a summary file for a video (e.g., as metadata or text), that summarizes (e.g., in words and/or computer readable language) the content of a video (e.g., the various features and aspects of the visual and audio content of the video) and/or collective user interest in the video with respect to the respective segments of the video.

Summary video component 110 is configured to employ information identified and/or generated by analysis component 108 regarding features and aspects of respective segments or groups of segments of a video and generate one or more shortened/summary versions of the video. In particular, summary video component 110 can be configured to analyze the various features, aspects, and summaries of segments and/or groups of segments of a video and cut the video based on the various features, aspects and summaries of the respective segments and/or groups of segments. For example, based on the various features, aspects and/or summaries of segments and/or groups of segments, summary video component can indentify of subsets of segments of the video that capture the essence of key parts of the video (e.g., parts associated with each of the primary scenes in the video, parts associated with the video considered most entertaining to users, parts that are consider particularly funny, particularly exciting, particularly moving, particularly eventful, particularly climatic, etc.). The summary video component 110 can then extract these segments, combine these segments, and generate a shortened version of the video. The summary video component can further cut segments of the video that include repetitive and/or dull content. However, it should be appreciated that the various techniques and mechanisms for identifying segments of a video to cut and segments of a video to include in a shortened version of a video can vary and are not limited to those described and exemplified herein.

In an aspect, summary video component 110 can tag respective segments of a video with ranking information that represents their level of priority for inclusion in a summary video. The ranking applied to a segment can be a function of the variety of factors identified by analysis component 108, including but not limited to: actions and events associated with the segment, people occurring in the segment, objects appearing in the segment, words spoken in the segment, music occurring in the segment, user interest in the segment, whether the segment is a start of a new scene, whether the segment includes repetitive content, and whether the segment includes new content. Summary video component 110 can further cut segments tagged or associated with a lower ranking before segments associated with a higher ranking when generating a shortened version of the video.

For example, summary video component 110 can determine or infer segments or groups of segments of the video that are associated with key aspects or events and segments of the video that are associated with less significant details of the video based on summaries of the respective segments or groups of segments. Those segments associated with key aspects can receive a higher ranking than those segments associated with less significant aspects. For example, a video of a steeplechase can include several similar frames of the horse and rider running through a field and fewer unique frames where the horse encounters a jump or fence. According to this example, summary video component 110 can determine or infer that the frames at which the horse encounters the jumps/fences are more entertaining than those frames where the horse is merely running through the field and associated the frames at which the horse encounters the jumps/fences with a higher ranking.

In an aspect, summary video component 110 can be configured to generate a single shortened version of a video with a set duration. For example, summary video component 110 can be configured to generate M minute (e.g., 5 minute) summary versions of respective videos provided by media provider 102. According to this example, summary video component 110 can skip generating summary videos for videos originally less than M minutes. In another example, summary video component 110 can be configured to generate shortened versions of respective videos provided by media provider 102 where the duration of the shortened version is determined by summary video component 110 (e.g., based on a variety of factors such as length of the original video, content of the video, features of the respective segments of the video, potential points in the video suitable for cutting and/or splicing the video, etc). According to this example, the summary version of original videos of a same length can have different durations. For example an original 30 minute video could have a summary version that is 7.5 minutes and another original 30 minute video could have a summary version that is 4.3 minutes.

In another aspect, summary video component 110 can be configured to generate multiple different length summary versions of respective videos provided by media provider 102. According to this aspect, the number of versions and the durations of the respective versions can be fixed or vary as function of the length of the original video (and/or as a function of other factors such as, content of the video, features of the respective segments of the video, potential points in the video suitable for cutting and/or splicing the video, etc.). For example, for respective videos provided by media provider 102, summary video component 110 can be configured to generate V different length versions, where V is a number and where V can vary based on the length of the original video. For example, for videos that are originally between 5 to 10 minutes in length, V can be 1. In another example, for videos that are originally between 10 to 20 minutes in length, V can be 2, and for videos that are originally greater than 20 minutes in length, V can be 3. The durations of respective versions of a video can also be a function of the duration of the original video. For example, for videos that are about 5 minute in length, summary video component 110 can be configured to generate 2 minute versions, for videos that are about 10 minutes in length, summary video component 110 can be configured to generate 5 minute versions and 2 minute version, for videos that are about 30 minute in length, summary video component can be configured to generate 15 and 5 minute version, etc.

In an aspect, when generating shortened versions of videos, summary video component 110 can actually generate new video files that are the edited versions of the video. For example, summary video component 110 can cut segments of a video and splice or adjoin segments of the video where gaps are established as a result of cut segments. Summary video component 110 can then store the edited version of the video in a separate file from the original version of the video. In another aspect, summary video component 110 can generate a metadata file to associate with an original video file that indicates certain segments of the video to include and/or exclude when the video is streamed via media provider and/or played at a client device based on the version selected. For example, summary video component can tag segments of the video file with different markers representative of segments of the video to include in different length versions of the video. When one of the versions is selected for playing, media provider 102 can stream and/or a client device video player can read, only those segments with tags corresponding to the selected version.

Figure 2:
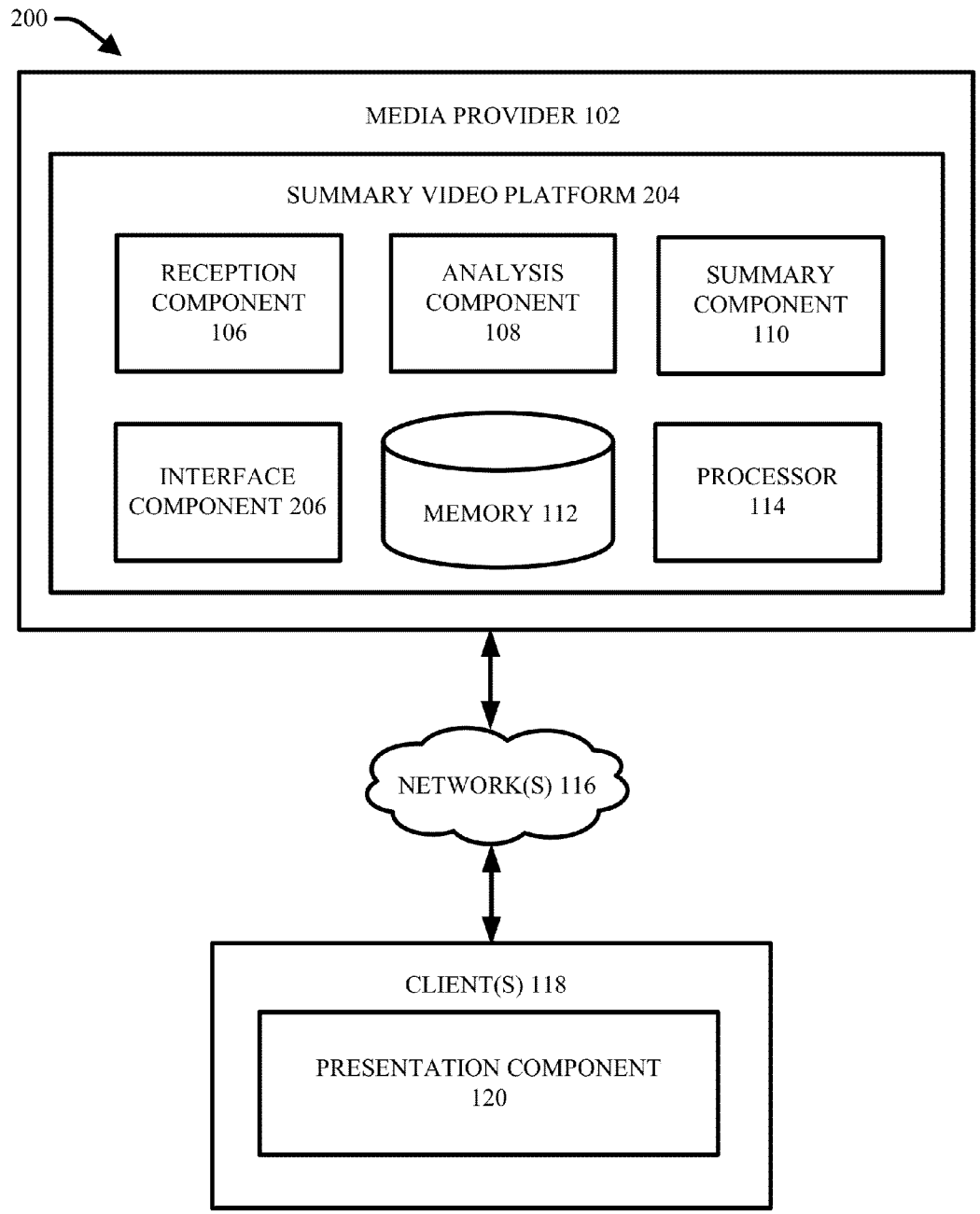
FIG. 2 presents an example user interface displaying videos provided by a media provider with options to select different length versions of the respective videos for playback at client device in accordance with various aspects and embodiments described herein.

FIG. 2 presents a diagram of another example system 200 for generating and presenting different length versions of a video, in accordance with various aspects and embodiments described herein. System 200 includes same or similar features and functionalities of system 100 with the addition of an interface component 206 to summary video platform 204. Repetitive description of like elements employed in respective embodiments of systems and methods described herein are omitted for sake of brevity.

Interface component 206 is configured to configure and/or generate a graphical user interface (GUI) with information identifying videos provided by media provider 102 that are available for streaming to a client device 118. The information identifying the videos further includes information indicating lengths of different versions of the video available for streaming by media provider 102 or otherwise available for receiving (e.g., as streamed or downloaded) and playing at client device 118. GUI interfaces configured and/or generated by interface component 206 are displayed/presented at client device 118 via presentation component 120.

Figure 3:
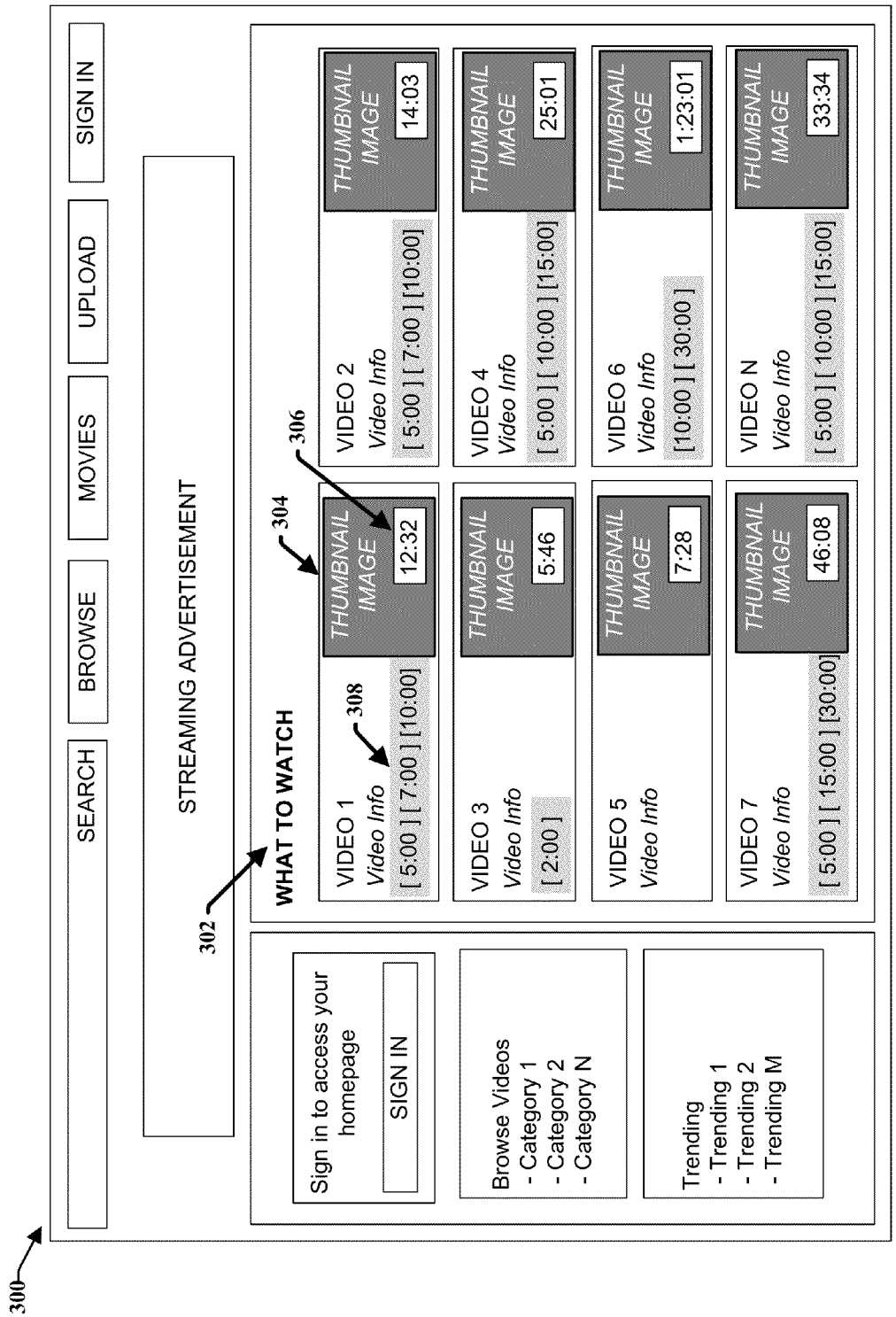
FIG. 3 illustrates another example system for generating and providing different length versions of a video in accordance with various aspects and embodiments described herein.

FIG. 3 demonstrates an example GUI interface 300 configured and/or generated by interface component 206 in accordance with aspects and embodiments described herein. Interface 300 can be displayed at a suitable client device 118 via presentation component 120. Interface 300 can facilitate navigating and presenting media content available for streaming by an online streaming media provider (e.g., media provider 102). For example, interface 300 includes a "what to watch" section 302 displaying information and thumbnails (e.g., 304 and the like) representative of a plurality of different videos (e.g., video 1, video 2, video 3 . . . video N) recommended to a user for viewing. Each of the thumbnails of the videos are presented with information identifying the respective videos and at least a time marker 306 indicating an original length of the video.

Videos for which one or more shortened summary versions are available are further marked or noted via an alternative version section (e.g., section 308 and the like, highlighted in gray). For example, video 1 and video 2 include a 5 minute version, a 7 minute version, and a 10 minute version. Similarly video 3 includes a 2 minute version, video 4 includes a 5, 10 and 15 minute version, and video 6 includes a 10 and 30 minute version, video 7 includes a 5, 15 and 30 minute version and video N includes a 5, 10 and 15 minute version. Video 5 does not have a summary video version associated therewith. In an aspect, for a video having one or more summary versions, a user can select either the original length version of the video for playing or one of the summary versions. Accordingly, if a user would like to watch a certain video but does not have enough time to watch the full length version, the user can simply select a shorter version of the video to watch.

Figure 4:
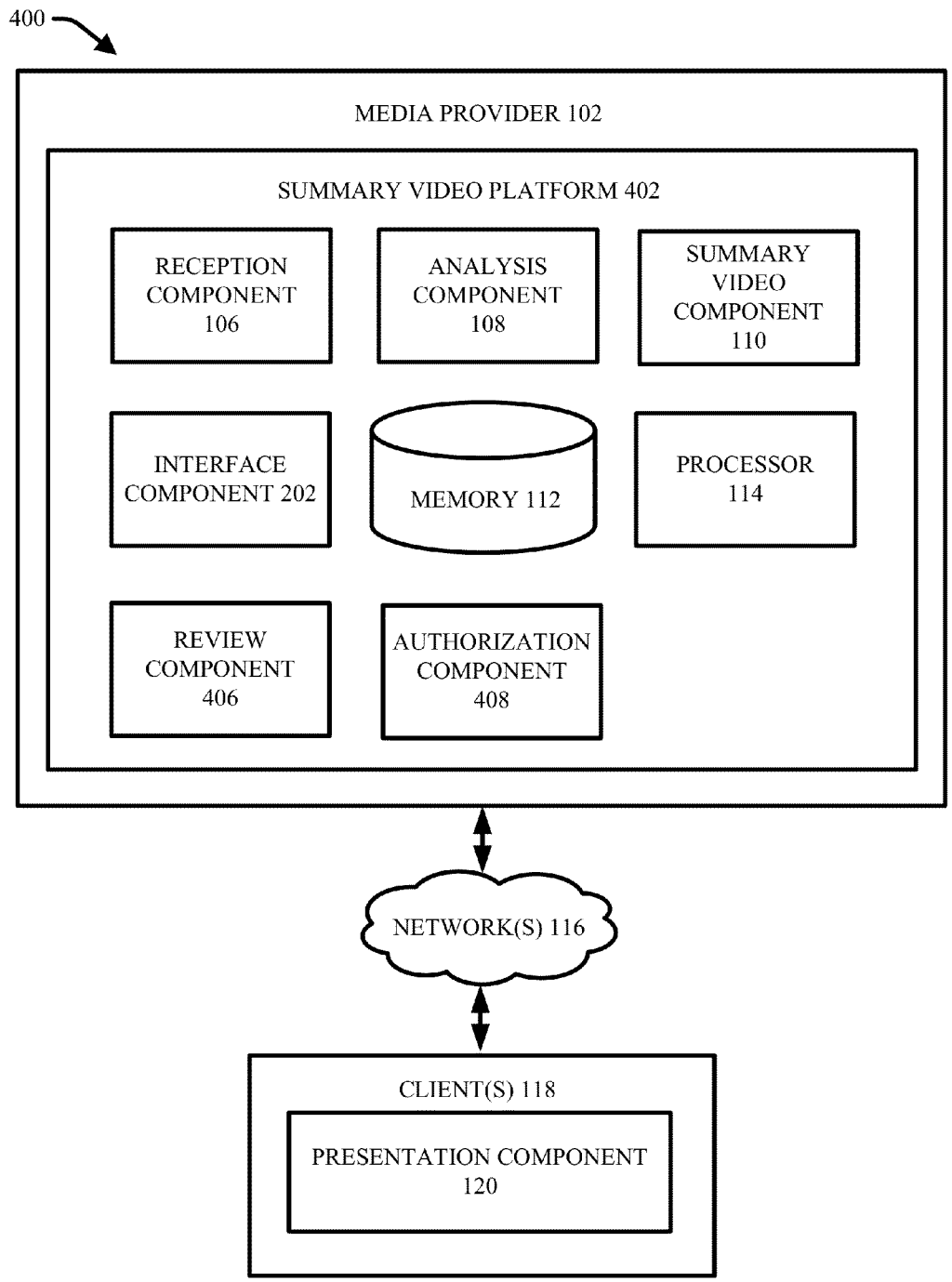
FIG. 4 illustrates another example system for generating and providing different length versions of a video in accordance with various aspects and embodiments described herein.

FIG. 4 presents a diagram of another example system 400 for generating and presenting different length versions of a video, in accordance with various aspects and embodiments described herein. System 400 includes same or similar features and functionalities of system 200 with the addition of review component 406 and authorization component 408 to summary video platform 402. Repetitive description of like elements employed in respective embodiments of systems, methods and interfaces described herein are omitted for sake of brevity.

Review component 406 is configured to provide video uploaders or entities otherwise associated with ownership (e.g., content creators, publishers, licensee's etc.) of a video for which a summary version is to be generated, an opportunity to review a summarized version of the video before it is published. Authorization component 408 is configured to allow the uploader or entity associated with ownership of the video to authorize publication of a summary/shortened version of the video before it is published (e.g., upon review). In an aspect, analysis component 108 can generate a summary file summarizing various features and aspects of respective segments of a video. Summary video component 110 can then generate one or more shortened versions of the video based on the summary file. According to this aspect, review component 406 can provide the summary file to the uploader of the video for review and editing thereof. Upon completion of review, the uploader can authorize (e.g., via authorization component) summary video platform 402 to generate summary versions of the video based on the summary file.

In another aspect, after summary video component 110 has generated a summary version of a video, review component 406 can play the summary version back to the uploader before publication for the uploader to approve. In response to approval of the summary version of the video, the uploader can authorize publication of the summary version. In response to disapproval of the summary version, the uploader can disapprove publication of the summary version and/or request summary video component 110 generate a new summary version of the video.

Figure 5:
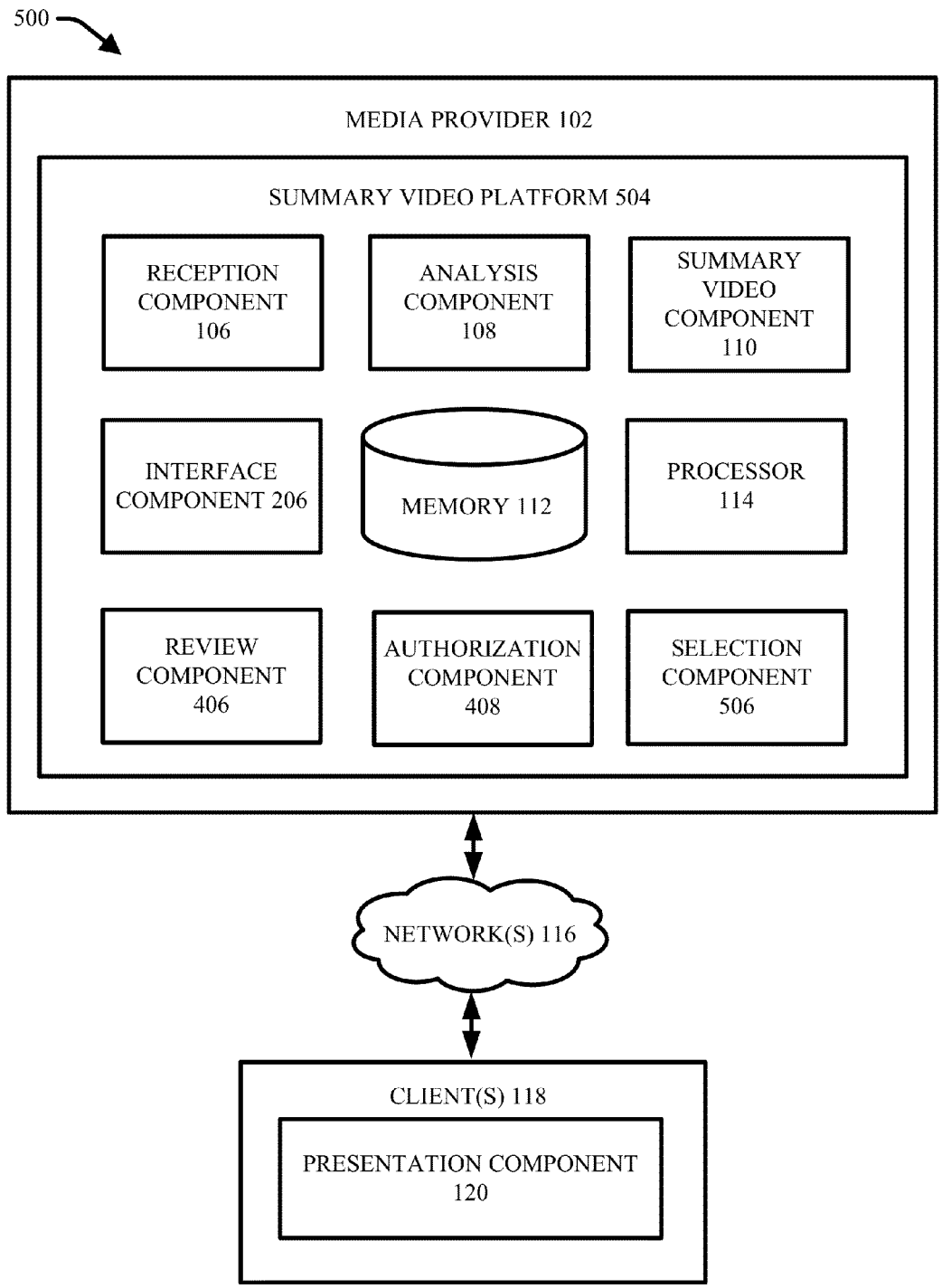
FIG. 5 illustrates another example system for generating and providing different length versions of a video in accordance with various aspects and embodiments described herein.

FIG. 5 presents a diagram of another example system 500 for generating and presenting different length versions of a video, in accordance with various aspects and embodiments described herein. System 500 includes same or similar features and functionalities of system 400 with the addition of selection component 506 to summary video platform 502. Repetitive description of like elements employed in respective embodiments of systems, methods and interfaces described herein are omitted for sake of brevity.

Selection component 506 is configured to provide an uploader of a video (or entity otherwise associated with ownership of the video) tools for influencing the number of summary videos generated for the video, the duration of the respective summary videos and the content included in the respective summary videos of the video. For example, in response to uploading a video or otherwise providing the video to summary video platform 504 for the generating shortened version of the video, using selection component 506 the uploader can indicate or request how many summary video versions of the video the uploader would like summary video platform 504 to generate. The uploader can further indicate desired lengths for the respective summary videos. For example, an uploader can upload a 56 minute video and request summary video platform generate a 5 minute version, a 15 minute version, and a 30 minute version. In response to the selection data, summary video component 110 can generate the corresponding summery videos based on the requested parameters.

In another aspect, using selection component 506, the uploader of the video can tag, mark or otherwise indicate segments of the video the uploader would like included in a summary video and/or segments of the video the uploader would like excluded from the summary video. For example, the uploader can highlight or tag interesting parts in the video that the uploader considers good material for inclusion in a summary video. The uploader can also highlight or tag parts of the video the uploader would like to be cut from the summary video. In accordance with this aspect, the uploader can also provide ranking information indicating relative levels of importance of respective segments of a video for inclusion in a summary video. For example, the uploader can tag segments of the video with a score from 1 to 10, where a score of 1 indicates the segment is not a good candidate for inclusion in the summary video and a score of 10 indicates is a very good candidate for inclusion in the summary video. Scores from 2-9 can indicate varying and relative degrees of importance of the respective segments with respect to inclusion in a summary video. Summary video component 110 can employ selection data provided by the uploader regarding segments to include/exclude in a summary video when generating the summary video.

Figure 6:
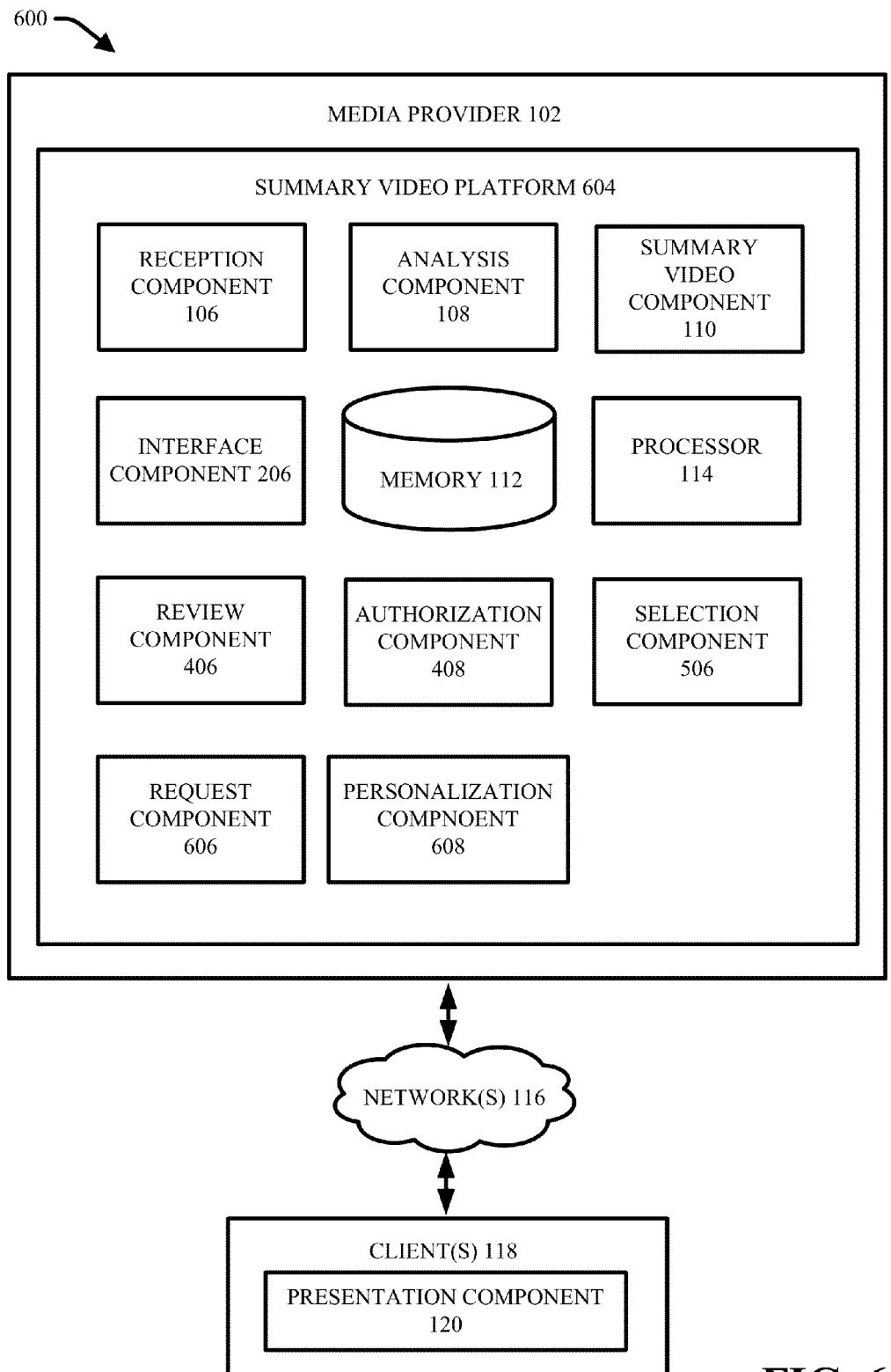
FIG. 6 illustrates another example system for generating and providing different length versions of a video in accordance with various aspects and embodiments described herein.

FIG. 6 presents a diagram of another example system 600 for generating and presenting different length versions of a video, in accordance with various aspects and embodiments described herein. System 600 includes same or similar features and functionalities of system 500 with the addition of request component 606 and personalization component 608 to summary video platform 602. Repetitive description of like elements employed in respective embodiments of systems, methods and interfaces described herein are omitted for sake of brevity.

In an aspect, summary video platform 604 is configured to generate a summary version of a video in response to a request for a summary video received from a user who would like to view the summary version of the video. The request can indicate at least a desired length of the summary video. For example, a user could find a video he or she is interested in viewing provided by media provider 102 that is a duration longer than the amount of time the user would like to devote to watching the video. Using summary video platform 604, the user can send a request for the generation of a shortened version of the video. In response to the request, summary video component 110 can generate the shortened version of the video and stream or otherwise provide the shortened version of the video to the user (e.g., via at client device 118) as opposed to the full length version of the video. For example, the request could indicate a 10 minute version of the video is desired. In response to the request, summary video component 110 can generate the 10 minute version of the video. According to this aspect, in the alternative of and/or in addition to generating multiple different duration summary versions of a video and making these versions available to potential viewers, summary video component 110 can generate a summary version of a video on the fly.

Summary video platform 604 can include request component 606 to receive and process such requests for a summary version of a video. As noted above, the request can indicate at least a specific duration for a desired summary video. For example, request component 606 can receive a request for a 5 minute version of a video, a 7 minute version of a video, an 11.5 minute version of a video, a 32 minute version of a video, etc. In another aspect, the request can specify a broader range of time for a summary video. For example, the request can indicate a summary video between about 5-7 minutes is desired or a video between 15-20 minutes is desired. According to this aspect, summary video component 110 can be afforded greater leniency when generating the requested summary version of a video on the fly.

In an aspect, when generating a summary video version of a video on the fly (e.g., in response to a user request), summary video component 110 can edit a full length version of the video in a same or similar manner to that described with respect to the mechanisms by which summary video component 110 can generate multiple different length versions of the video, as discussed with reference to FIG. 1.

In another aspect, where summary video component 110 has previously generated one or more summary versions of a video of various durations, in response to a request for a summary video of a specified duration, summary video component 110 can identify one of the previously generated summary versions of the video having duration closest to the specified duration. Summary video component can then work off of that previously generated summary version of the video to create the video with the specified duration. In particular, the summary video component 110 can add and/or subtract segments from the previously generated summary version to create the version having the specified duration.

For example, a user could request a 12 minute summary version of a video for which a previously generated 10 minute summary version exists. According to this example, summary video component 110 can simply add 2 minute of video to the 10 minute version to generate the 12 minute version (as opposed to starting over from scratch). In an aspect, all summary versions generated for a video (e.g., as initially generated in response to upload of the video and/or in response to a summary video request from a user) can be stored in memory (e.g., memory 112) accessible to summary video platform. These summary versions can later be re-used and/or modified in response to future request for summary versions of the video.

In an aspect, in addition to specifying a desired duration of a requested summary video, request component 606 can receive summary video requests specifying additional features for a requested summary video. For example, the request can indicate a certain actor, object or place appearing in the video to focus on or highlight in the summary video. According to this example, a user could request a summary video of a basketball game that is X minutes long and features actions shots including player number 41. In another example, a user could request a summary video that focuses on scenes occurring at the lake house or scenes featuring children and animals. In another example, a user could request a summary video that does not include profanity or violence.

It should be appreciated that a variety of different features/ parameters associated with an original can be identified by a user in a summary video request to tailor the summary video to the user's noted preferences. Summary video component 110 can employ the various features and summaries of video segments identified by analysis component 108 to generate a requested summary video based on the features noted in the request. For example, summary video component 110 can generate a requested "humorous" summary version of a video having a requested X length by using metadata identifying various parts of the video considered humorous. According to this example, summary video component can extract the humorous segments in association with generating the summary video having the duration X.

Personalization component 608 is configured to facilitate generating a summary version of a video that is personalized for a user based on learned or known information regarding preferences of the user to which the summary video will be provided. For example, in a similar manner to that noted above regarding generating a summary video in response to a summary video request having a specified duration and specified features, personalization component 608 can automatically identify certain features and aspects of a video to include in a summary video based on the user to which the summary video will be provided. According to this aspect, a summary video request can merely indicate a desired duration of a summary video. However, in response to the summary video request, personalization component 608 can examine information about the user from which the request was received regarding preferences of the user and direct summary video component 110 to tailor the summary video based on the user preferences.

For example, the user preferences can relate to types of videos the user tends to watch or particular features of those videos the user tends to enjoy. In addition to user preference, personalization component 608 can further direct summary video component 110 to tailor a summary video based on one or more of the following factors: demographics of the user (e.g., age, gender, language, location, etc.), watch history of the user, video sharing history of the user, video commenting of the user, social affiliations of the user, trending videos, or trending parts of videos. According to this aspect, a 5 minute summary version of a certain video that is to be played to a male audience can include entirely different content than another five minute version of the same video that is to be played to a female audience.

Figure 7:
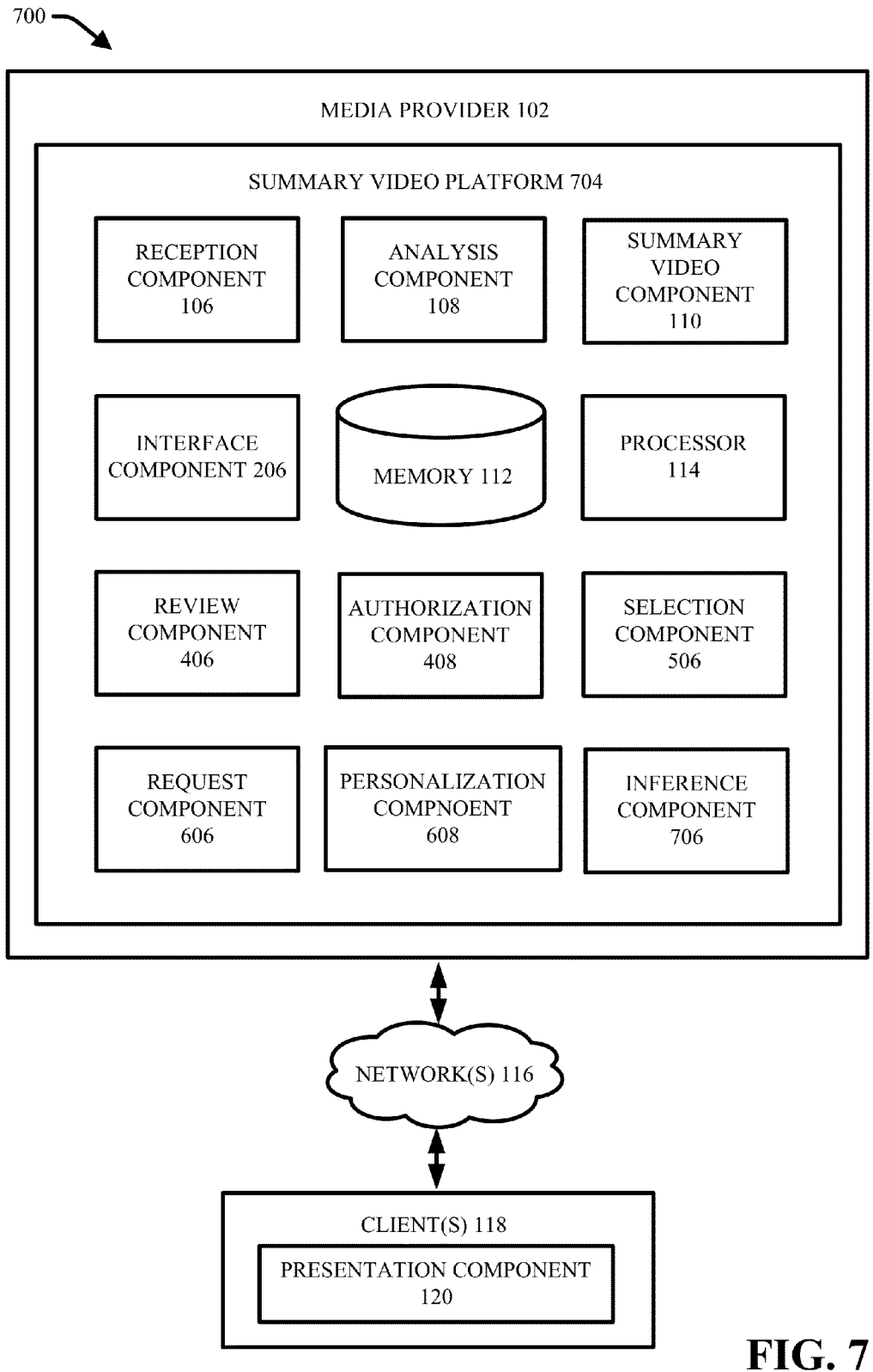
FIG. 7 illustrates another example system for generating and providing different length versions of a video in accordance with various aspects and embodiments described herein.

FIG. 7 presents a diagram of another example system 700 for generating and presenting different length versions of a video, in accordance with various aspects and embodiments described herein. System 700 includes same or similar features and functionalities of system 600 with the addition of inference component 706 to summary video platform 704. Repetitive description of like elements employed in respective embodiments of systems, methods and interfaces described herein are omitted for sake of brevity.

Inference component 706 is configured to provide for or aid in various inferences or determinations associated with aspects of summary video platform 704. In an aspect, all or portions of summary video platform 704 can be operatively coupled to inference component 402. Moreover, inference component 402 can be granted access to all or portions of media provider 102, client device 118, and other sources (no shown) accessible via network 116.

In an aspect, analysis component 108 can employ inference component 706 to infer features and aspects of content of segments of a video and to facilitate inferring summaries of content of respective segments of a video. Summary video component 110 can further employ inference component 706 to infer how to edit a full length version of a video to generate one or more summary versions of a video. For example, summary video component 110 can employ inference component 706 to infer which segments of a video to include/exclude in a summary video based on a desired length of the summary video, preferences associate with a user to which the summary video will be provided, and summaries of features and content associated with the respective segments of the video.

In order to provide for or aid in the numerous inferences described herein, inference component 706 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 8:
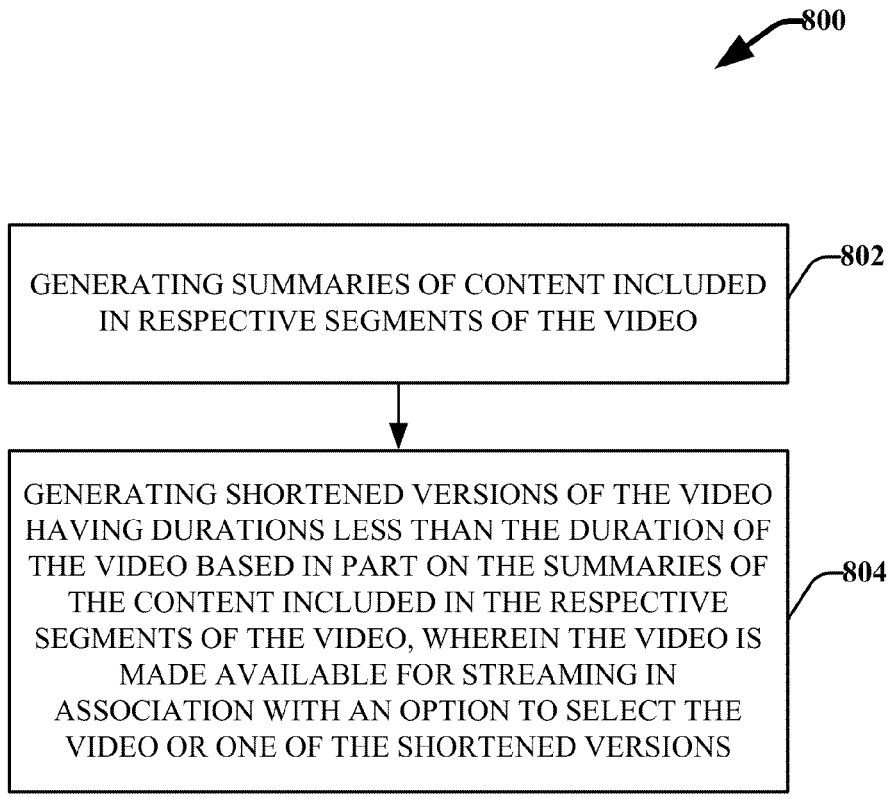
FIG. 8 is flow diagram of an example method for generating and presenting shortened versions of a video in accordance with various aspects and embodiments described herein.
Figure 9:
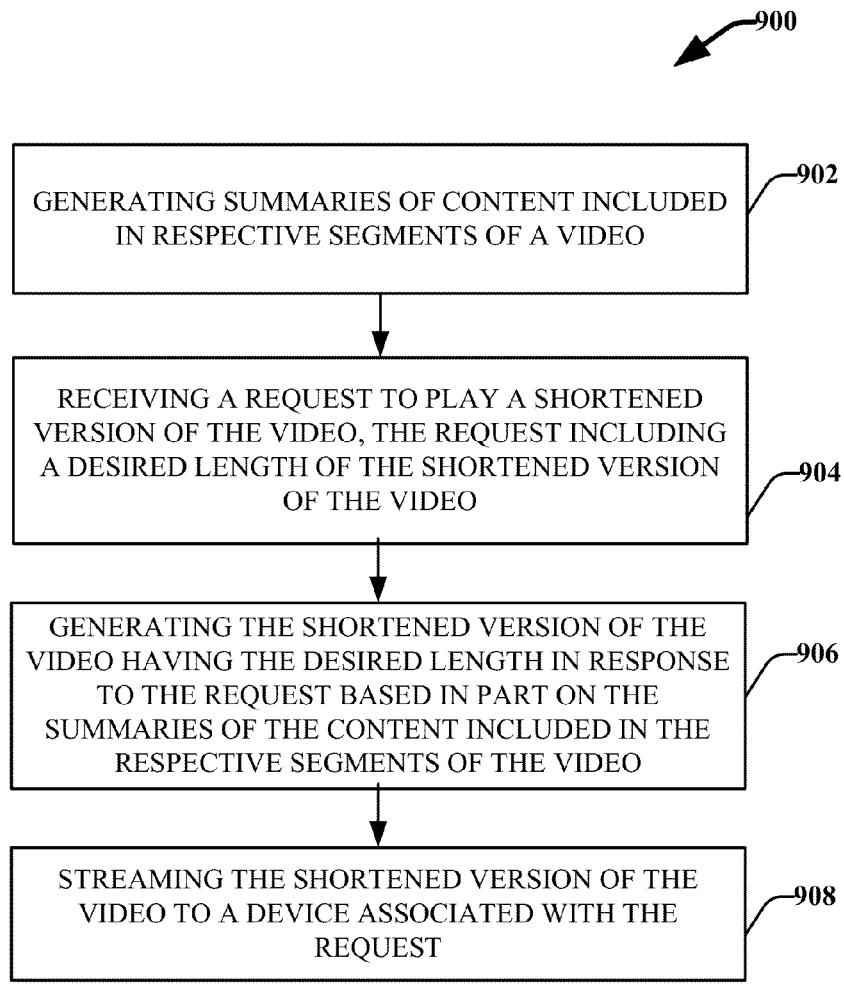
FIG. 9 is flow diagram of another example method for generating and presenting shortened versions of a video in accordance with various aspects and embodiments described herein.
Figure 10:
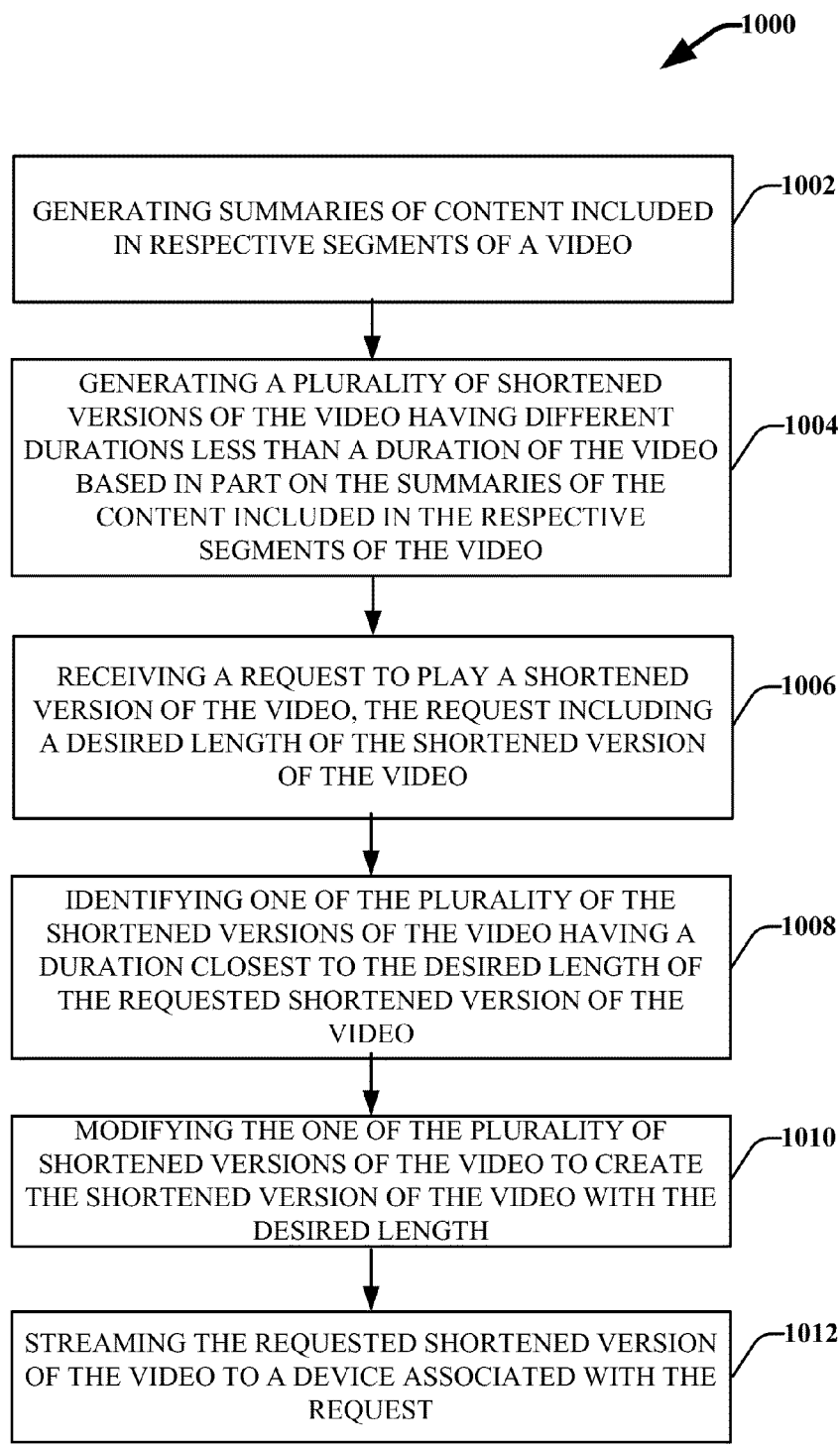
FIG. 10 is flow diagram of another example method for generating and presenting shortened versions of a video in accordance with various aspects and embodiments described herein.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for generating and displaying different length versions of a video in accordance with various aspects and embodiments described herein. At 802, summaries of content included in respective segments of the video are generated (e.g., via analysis component 108). For example, analysis component 108 can analyze a video an associate metadata with the video summarizing key features and aspects of what appears and what occurs in respective segments or groups of segments of the video. The metadata can also indicate starts of new scenes in the video and user interest levels determined for the different segments of the video. At 804, shortened versions of the video (e.g., one or more versions) having durations less than the duration of the video are generated based in part on the summaries of the content included in the respective segments of the video (e.g., via summary video component 110). The video is further made available for streaming in association with an option to select the video or one of the shortened versions. For example, a video that is 30 minutes in length can be automatically cut and edited to generate a 5 minute version, a 10 minute version, and a 15 minute version in addition to the original 30 minute version. Each of these different length versions of the video can be made available to potential viewers so that a viewer can select which version of the video they would like to watch.

FIG. 9 illustrates a flow chart of another example method 900 for generating and displaying different length versions of a video in accordance with various aspects and embodiments described herein. At 902, summaries of content included in respective segments of the video are generated (e.g., via analysis component 108). For example, analysis component 108 can tag respective segments of a video with metadata identifying various features and aspects associated with the respective segments (e.g., things appearing in the segments, words spoken in the segments, actions occurring in the segments, etc.). At 904, a request to play a shortened version of the video is received (e.g., via request component 606). The request can include information indicating a desired length of the shortened version of the video. For example, while browsing videos provided by on online media provider, a user could find a video that is 55 minutes long. The user may want to watch the video but does not have enough time to watch the whole video. According, the user can request a shortened version of the video, such as a 20 minute version of the video. At 906, the shortened version of the video having the desired length is generated (e.g., via summary video component 110) in response to the request based in part on the summaries of the content included in the respective segments of the video.

In furtherance to the above example, summary video component can identify segments or groups of segments of the video related to the primary scenes and/or key parts in the video based on the summaries/metadata associated with the respective segments. The summary video component can then extract and combine these segments to generate a 20 minute version of the video. Then at 908, the shortened version of the video is streamed to a device associated with the initial request.

FIG. 10 illustrates a flow chart of another example method 1000 for generating and displaying different length versions of a video in accordance with various aspects and embodiments described herein. At 1002, summaries of content included in respective segments of the video are generated (e.g., via analysis component 108). At 1004, a plurality of shortened version of the video having different duration less than duration of the video are generated based in part on the summaries of the content included in the respective segments of the video. At 1006, a request to play a shortened version of the video is received (e.g., via request component 606). The request can include information indicating a desired length of the shortened version of the video. At 1008, one of the plurality of the shortened versions of the video having duration closest to the desired length of the requested shortened version of the video is identified. At 1010, the one of the plurality of the shortened versions of the video is modified to create the shortened version of the video with the desired length. At 1012, the requested shortened version of the video is streamed to a device associated with the request.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
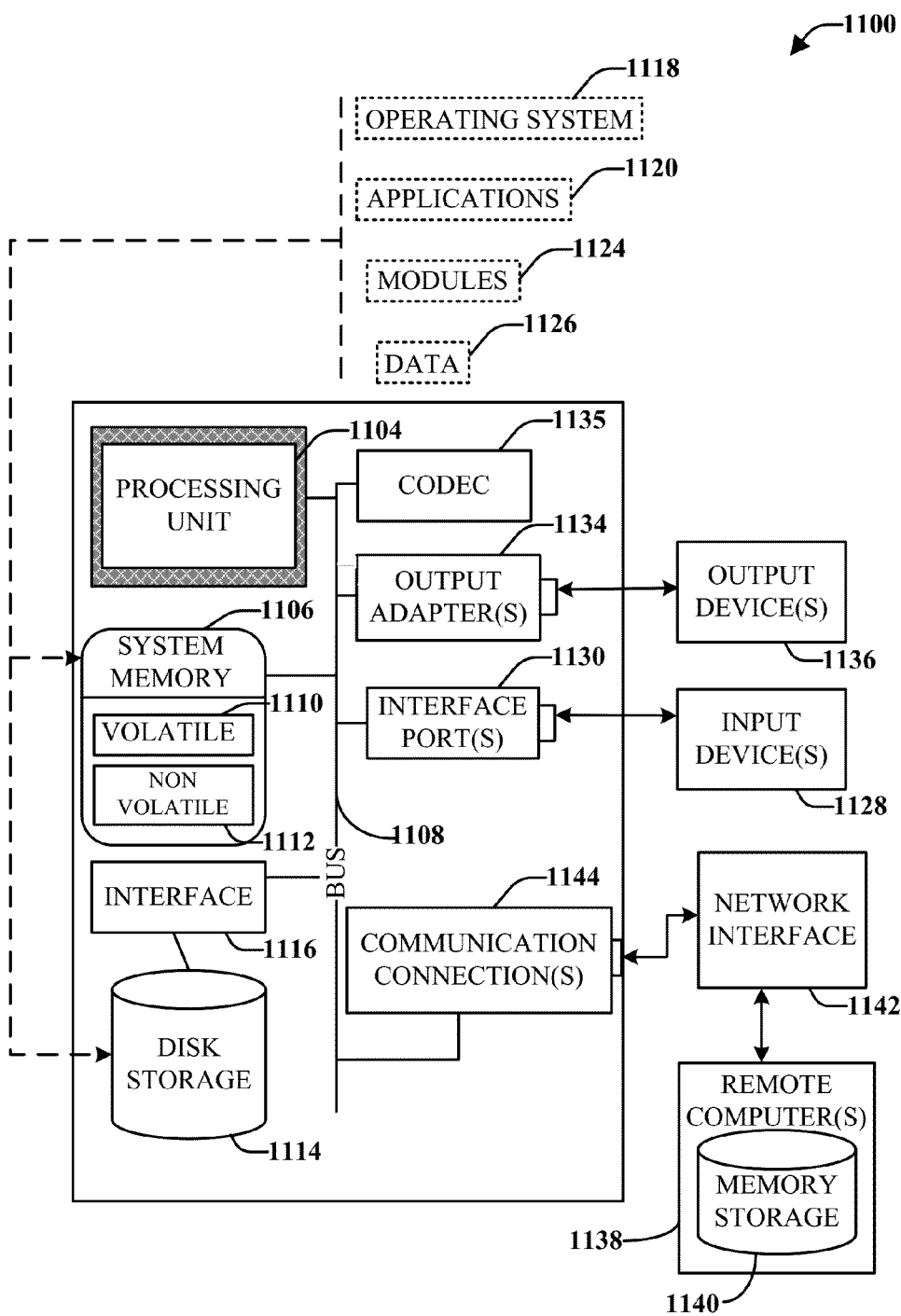
FIG. 11 is a schematic block diagram illustrating a suitable operating environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 11114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
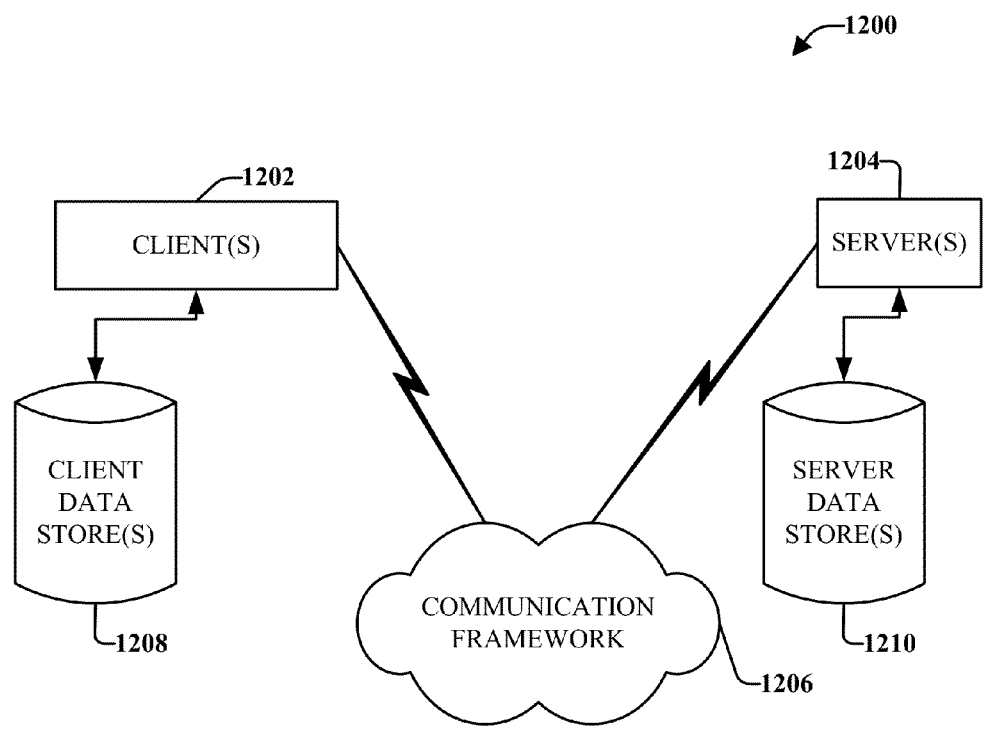
FIG. 12 is a schematic block diagram of a sample-computing environment in accordance with various aspects and embodiments.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, e.g., associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store(s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
   a processor; and
   a memory communicatively coupled to the processor, the memory having stored therein computer executable instructions, comprising:
     an analysis component configured to analyze a video and generate summaries of content included in respective segments of the video; and
     a review component configured to provide the summaries of the content included in the respective segments of the video to an owner of the video;
     an authorization component configured to receive authorization from the owner to generate shortened versions of the video; and
     a summary component configured to, in response to the authorization, generate the shortened versions of the video having durations less than a duration of the video based in part on the summaries of the content included in the respective segments of the video, wherein the video is made available for streaming in association with at least one option to select the video or the shortened versions.

2. The system of claim 1, further comprising a reception component configured to receive the video as an upload, wherein the analysis component is configured to analyze the video in response to reception of the video.

3. The system of claim 1, further comprising a selection component configured to receive user input regarding a desired duration of a shortened version of the video, and wherein the summary component is configured to generate a shortened version having the desired duration.

4. The system of claim 1, further comprising a selection component configured to receive user input regarding a segment of the video to include in a shortened version of the video, and wherein the summary component is configured to generate a shortened version having the segment of the video.

5. The system of claim 1, further comprising a selection component configured to receive user input regarding a segment of the video to exclude in a shortened version of the video, and wherein the summary component is configured to generate a shortened version without the segment of the video.

6. The system of claim 1, further comprising a selection component configured to receive user input regarding a number of shortened versions of the video to generate, and wherein the summary component is configured to generate the number of shortened versions of the video.

7. The system of claim 1, wherein the summary component is configured to determine durations of the shortened versions of the video based in part on the duration of the video.

8. The system of claim 1, wherein the summary component is configured to determine segments of the video to include in the shortened versions of the video based in part on information regarding user interest in the respective segments of the video.

9. The system of claim 1, wherein the summary component is configured to automatically generate a predetermined number of shortened versions of the video having different and predetermined durations.

10. The system of claim 1, further comprising:
    a request component configured to receive a request to play one of the shortened version of the video; and
    a streaming component configured to stream, via a network, the one of the shortened versions of the video in response to the request.

11. A method comprising:
    generating, by a system including a processor, summaries of content included in respective segments of a video;
    generating, by the system, a plurality of shortened versions of the video having different durations less than a first duration of the video based in part on the summaries of the content included in the respective segments of the video;
    receiving, by the system, a request to play a shortened version of the video, the request including a desired length of the shortened version of the video;
    identifying, by the system, one of the plurality of the shortened versions of the video having a second duration closest to the desired length;
    modifying, by the system, the one of the plurality of the shortened versions of the video to have the desired length in response to the request; and
    streaming, by the system, the modified one of the plurality of the shortened versions of the video to a device associated with the request.

12. The method of claim 11, wherein generating at least one of the plurality of the shortened versions of the video comprises selecting a subset of the segments of the video and joining the subset of the segments.

13. The method of claim 12, wherein the request is associated with a user and generating at least one of the plurality of the shortened versions of the video is based on preference of the user.

14. The method of claim 12, wherein the request further includes information related to a characteristic of segments to include or exclude in the video and wherein generating at least one of the plurality of the shortened versions of the video comprises including or excluding the segments of the video based on the characteristic.

15. The method of claim 14, wherein the characteristic relates to a least one of a person appearing in a segment, an object appearing in a segment, a level of violence associated with the segment, a level of vulgarity associated with content of the segment, or a level of profanity associated with language of the segment.

16. A non-transitory computer-readable medium having instructions stored thereon that, in response to execution, cause a system including a processor to perform operations, comprising:
   generating summaries of content included in respective segments of the video;
   generating a plurality of shortened versions of the video having durations less than a first duration of the video based in part on the summaries of the content included in the respective segments of the video;
   receiving a request to play a shortened version of the video, the request including a desired duration of the shortened version of the video;
   identifying one of the plurality of the shortened versions of the video having a second duration closest to the desired duration;
   modifying the one of the plurality of the shortened versions of the video to have the desired duration in response to the request; and
   streaming the modified one of the plurality of the shortened versions of the video to a device associated with the request.

17. The non-transitory computer-readable medium of claim 16, wherein generating at least one of the plurality of the shortened versions of the video comprises:
   identifying a preference of a user associated with the request; and
   including segments of the video in the at least one of the plurality of shortened versions of the video based on the preference of the user.

18. A method comprising:
   analyzing, by a system including a processor, a video and generate summaries of content included in respective segments of the video; and
   providing, by the system, the summaries of the content included in the respective segments of the video to an owner of the video;
   receiving, by the system, authorization from the owner to generate shortened versions of the video; and
   in response to the authorization, generating, by the system, the shortened versions of the video having durations less than a duration of the video based in part on the summaries of the content included in the respective segments of the video, wherein the video is made available for streaming in association with at least one option to select the video or the shortened versions.

19. The method of claim 18, further comprising:
receiving, by the system, user input regarding a desired duration of a shortened version of the video, and
generating a shortened version of the video having the desired duration.

20. A system, comprising:
a processor; and
a memory communicatively coupled to the processor, the memory having stored therein computer executable instructions, comprising:
   an analysis component configured to generate summaries of content included in respective segments of the video;
   a summary component configured to generate a plurality of shortened versions of the video having durations less than a first duration of the video based in part on the summaries of the content included in the respective segments of the video;
   an interface component configured to receive a request to play a shortened version of the video, the request including a desired duration of the shortened version of the video;
   wherein the summary component is further configured to identify one of the plurality of the shortened versions of the video having a second duration closest to the desired duration, and modify the one of the plurality of the shortened versions of the video to have the desired duration in response to the request; and
   wherein the interface component is further configured to stream the modified one of the plurality of the shortened versions of the video to a device associated with the request.

* * * * *